United States Patent [19]

Evenson et al.

[11] 4,220,359
[45] Sep. 2, 1980

[54] PUSH-TO-CONNECT AIR BRAKE FITTING

[75] Inventors: James E. Evenson, Chicago; Richard M. Kleckner, Arlington Heights; James W. Ma, Des Plaines, all of Ill.

[73] Assignee: Gould Inc., Rolling Meadows, Ill.

[21] Appl. No.: 910,312

[22] Filed: May 30, 1978

[51] Int. Cl.² ............................................. F16L 33/22
[52] U.S. Cl. .................................... 285/249; 285/259
[58] Field of Search ............ 285/238, 249, 255, 382.4, 285/307, 322, 323, 256, 259, 308, 245, 246, 247, 248, 105

[56] References Cited

U.S. PATENT DOCUMENTS

| | | | |
|---|---|---|---|
| 2,460,653 | 2/1949 | Raybould | 285/249 |
| 3,692,336 | 9/1972 | Von Zon | 285/255 X |
| 3,743,326 | 7/1973 | Courtot | 285/323 X |
| 3,815,940 | 6/1974 | Luckenbill | 285/105 |
| 4,062,572 | 12/1977 | Davis | 285/249 |
| 4,107,452 | 8/1978 | Ruzvi | 285/323 X |

FOREIGN PATENT DOCUMENTS 1464743 2/1977 United Kingdom ..................... 285/105

Primary Examiner—Dave W. Arola

Attorney, Agent, or Firm—Russell E. Baumann; Edward E. Sachs

[57] ABSTRACT

A push-to-connect fitting for sealed connection to a synthetic resin tube end. The fitting includes a body, an eyelet, a nut threadedly connected to the body, and a radially constrictible sleeve for retaining the tube end effectively positively within the fitting. The fitting is arranged to be connected to the tube end by a coaxial insertion of the tube end into the fitting with the tube end being received between the sleeve and the eyelet in moving to the fully inserted position. The sleeve is provided with annular gripping portions, one of which is slidably engaged by the tube end as it is inserted into the fitting. The one tube portion is arranged to be mechanically interlocked with the tube end as a result of an outward movement of the tube end from the fully inserted position whereupon the sleeve is concurrently urged axially outwardly with the tube end. Upon slight outward axial displacement of the sleeve, at least one other gripping portion of the sleeve is urged into gripping relationship with the tube end so as to provide an effectively positive retention of the tube end in the fitting. A seal is associated with the fitting to seal the tube end thereto in the installed arrangement.

15 Claims, 4 Drawing Figures

PUSH-TO-CONNECT AIR BRAKE FITTING

BACKGROUND OF THE INVENTION

1. Field of the Invention

This invention relates to push-to-connect fittings and in particular to push-to-connect fittings for use with relatively soft tubing, such as synthetic resin tubing.

2. Description of the Prior Art

In the conventional automotive air-brake systems, the components are normally interconnected by hoses or tubing. Such systems generate a relatively high fluid pressure, such as approximately 150 p.s.i., and also are subjected to relatively high temperatures and rigorous physical environments so that a serious problem arises relative to leakage and failure of the hoses and tubing, including undesirable separation thereof from the fittings of the system.

The use of synthetic resin tubing has increased due to the substantial advantages of lower cost and lower weight. A problem has arisen in the use of synthetic resin tubing in that the fittings previously adapted for use with metal tubing, such as copper tubing, have not proven suitable for use with the synthetic resin tubing.

A common fitting utilized in connection with synthetic resin tubing includes threaded cooperating body and nut members. An eyelet is installed coaxially within the fitting so as to be inserted within the outer end of the tubing and provide an internal support therefor. A tubular sleeve is provided within the fitting to receive the tube end therein.

It has been conventional in such fittings to utilize a camming action generated by the threading of the nut member onto the body member to constrict the sleeve radially inwardly into gripping engagement with the tube end, the tube end being supported, as indicated above, by the internally received eyelet.

In one form of such fitting, the sleeve is crimped onto the tube end prior to the make-up of the fitting by the application of suitable crimping tools to the pre-assembled sleeve and eyelet members. Such structure presents the disadvantage of requiring accurate forming of the clamped connection prior to the use thereof in the nut and body members. Special tools have been developed for effecting such accurate crimping but are relatively expensive and often are not used so that the resulting connection formed by conventional tools often is not fully satisfactory.

SUMMARY OF THE INVENTION

The present invention comprehends an improved push-to-connect fitting for sealed connection to a synthetic resin tube end such as for use in an air-brake system and the like. The fitting is adapted for reuse to permit selective assembly and disassembly as desired while yet providing an effectively positive retention of the tube end therein in the made-up arrangement of the fitting.

More specifically, the improved push-to-connect fitting of the present invention includes a body having a through bore defining a stepped recess at an axially outer end thereof, an eyelet coaxially received in the recess for coaxially receiving and internally supporting a tube end therein, a nut removably secured to the body coaxially of the bore and having a tubular guide portion spaced coaxially about the eyelet within the recess and defining axially outwardly narrowing frustoconical camming surface means, a radially constrictible tubular sleeve received coaxially within the guide portion and defining a plurality of coaxial, annular, axially spaced biting teeth including an axially inner tooth and at least one axially outer tooth, the inner tooth having a configuration permitting substantially free axial inward movement of the tube end between the inner tooth and the eyelet and having interlocking engagement with the tube end as an incident of axially outward movement of the tube end between the inner tooth and the eyelet whereby the sleeve is urged axially outwardly by the outward movement of the tube end, the guide portion of the nut urging at least the axially outermost of the biting teeth radially inwardly as an incident of the axially outward movement of the sleeve thereagainst to cause at least one axially outermost tooth to be also interlocked with the tube end for effectively limiting further axially outward movement of the tube end, and means for sealing the tube end to at least one of the body and nut members.

In the illustrated embodiment, the sleeve includes two outer teeth having substantially equal tip radii. The teeth may have a conical axially outward narrowing axially outer surface and a planar radially extending axially inner surface to define therebetween a sharp annular biting edge.

The sleeve may include deflectible end portion at the axially inner end and a deflectible end portion at the axially outer end.

The end portions may define frustoconical wall portions each narrowing axially outwardly. The axially outermost tooth may be carried by the axially outer deflectible end portion to provide the desired further biting engagement in the made-up arrangement of the fitting.

The sleeve may include cylindrical wall portions between the respective teeth to provide axial spacing therebetween, as desired.

The push-to-connect fitting of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
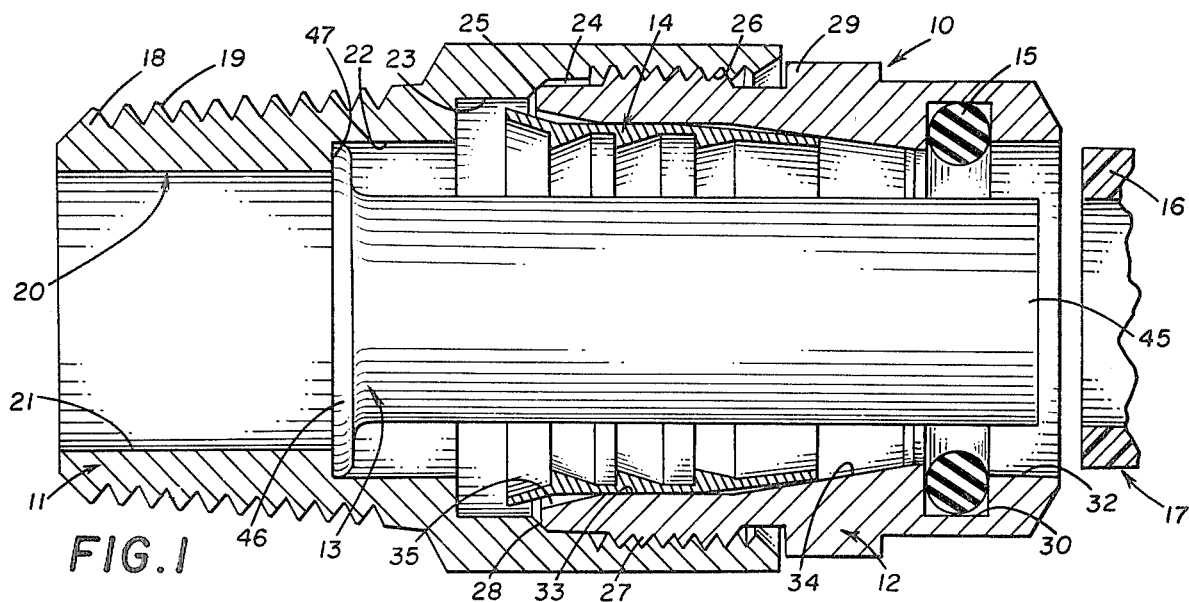
FIG. 1 is a diametric section of a push-to-connect fitting embodying the invention.

In the exemplary embodiment of the invention as disclosed in the drawing, a push-to-connect fitting generally designated 10 is shown to comprise a body 11, a nut 12, an eyelet 13, a retaining sleeve 14, and a sealing ring 15. The fitting is adapted for sealed connection to the end 16 of a tube generally designated 17 which may be formed of a synthetic resin or the like such as may be used in air-brake systems, etc. Fitting 10 is adapted to provide a positive mechanical and sealing connection of the tube end with the completion of the make-up of the fitting being indicated to the user to provide an improved connection.

More specifically, body 11 may include an axially inner portion 18 defining a male thread 19 for connecting the body to another part of the fluid system (not shown). A through bore generally designated 20 extends coaxially through the body 11 and is progressively stepped axially outwardly to define an axially inner cylindrical portion 21, a first enlarged intermediate cylindrical portion 22, a second further enlarged intermediate cylindrical portion 23, a fourth further enlarged intermediate cylindrical portion 24 joined to the intermediate portion 23 by a frustoconical outwardly widening surface 25, and an axially outer female threaded portion 26.

Nut member 12 includes an axially inner male threaded portion 27 which is adapted to be threaded into the female portion 26 of the body in the make-up of the fitting. The nut member further defines an innermost frustoconical surface 28 facially engaging the frustoconical surface 25 of the body in limiting the inward threading movement of the nut member relative to the body.

The nut may further define a flatted tool-engaging peripheral surface portion 29 for engagement by a suitable tool, such as a wrench, in making up the fitting. The axially outer end of the nut may include a radially inwardly opening annular recess 30 adapted to receive the O-ring 15. As shown in FIG. 1, the depth of the recess 30 is somewhat less than the cross-sectional diameter of the O-ring so that the O-ring projects radially inwardly from the recess in the free disposition thereof.

The nut further defines a through bore generally designated 31 having a cylindrical axially outer portion 32 into which the recess 30 opens. An intermediate cylindrical portion 33 is connected to the outer portion 32 by a frustoconical portion 34 which narrows axially outwardly from portion 33 to portion 32. The inner end of the bore is defined by a frustoconical portion 35 which narrows axially outwardly and which extends from adjacent bore portion 23 of the body member in the made-up arrangement of the fitting as shown in FIG. 1.

Figure 2:
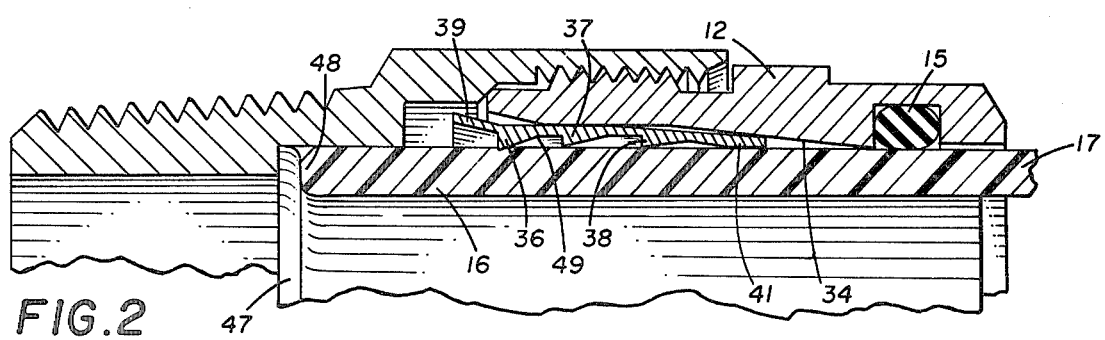
FIG. 2 is a fragmentary diametric section illustrating the arrangement of the fitting upon full insertion of the tube end thereinto as during make-up of the fitting.
Figure 4:
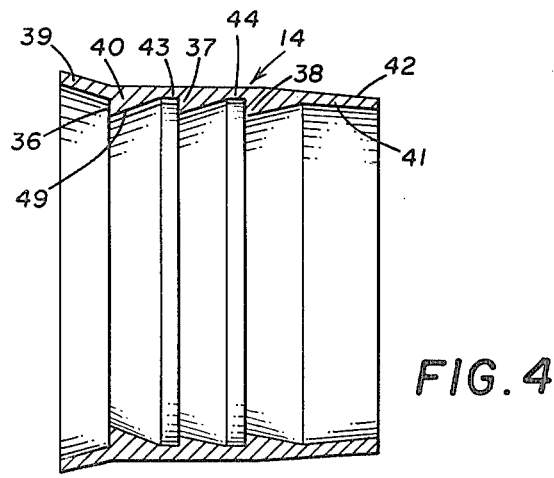
FIG. 4 is a diametric section of the sleeve element thereof.

As shown in FIG. 4, sleeve 14 comprises a radially constrictible, split tubular member defining an axially inner annular tooth 36, and a pair of axially outer annular teeth 37 and 38. The tip diameter of the tooth 36 is slightly smaller than the tip diameter of teeth 37 and 38. More specifically, the tip diameter of tooth 36 is slightly smaller than the outer diameter of the tube end 16 and the tip diameter of teeth 37 and 38 is substantially equal to the outer diameter of the tube end 16 in the free arrangement as shown in FIG. 2. The axially inner end of the sleeve defines a frustoconical wall portion 39 narrowing axially outwardly at an angle corresponding to the angle of the frustoconical surface 35 of the nut.

The intermediate portion of the sleeve is defined by a right circularly cylindrical outer surface 40 radially outwardly of teeth 36 and 37. The axially outer end of the sleeve is defined by a frustoconical wall portion 41 narrowing axially outwardly from the outer tooth 38. A frustoconical outer surface 42 extends axially outwardly from cylindrical surface 40 and radially outwardly of tooth 38 and defining the outer surface portion of end 41 of the sleeve. As seen in FIG. 2, the surface 42 extends at an angle to the axis of the fitting which is slightly less than that of the frustoconical surface 34 of the nut so that the outer end of the portion 41 may bear against surface 34, as seen in FIG. 2, in the free arrangement of the sleeve within the nut.

As further seen in FIG. 4, tooth 36 is spaced from tooth 37 by a short tubular portion 43 and tooth 37 is spaced from tooth 38 by a short tubular portion 44.

Eyelet 13 may comprise a tubular outer portion 45 adapted to freely receive the tube end 16 in coaxial relationship thereto when the tube end is inserted into the fitting, as seen in FIG. 2. The axially inner end 46 defines an annular flange adapted to seat against the planar surface 47 between bore portions 21 and 22, as seen in FIG. 1. The outer diameter of the flange 47 is preselected to cause the flange to be snugly received within the cylindrical portion 22 of the bore 20 to stabilize the disposition of the eyelet for facilitated insertion of the tube end.

As indicated above, fitting 10 comprises a push-to-connect fitting. Thus, the connection of the tube end 16 to the fitting is effected by a simple coaxial insertion of the tube end from the position of FIG. 1 to the position of FIG. 2. During each insertion, the tube end passes within the O-ring 15 to expand the inner surface thereof radially outwardly and thereby form a seal between the tube end and the nut 12, as seen in FIG. 2. As the distal end 48 of the tube end passes further axially inwardly, it freely slides within the teeth 37 and 38 but engages the axially outer frustoconical surface 49 of the inner tooth 36. Thus, the surface 49 acts as a guide to permit the tube end 48 to continue to be urged axially inwardly with substantially free movement to the fully inserted position of FIG. 2 wherein the end 48 abuts the flange 47 of the eyelet 13.

Figure 3:
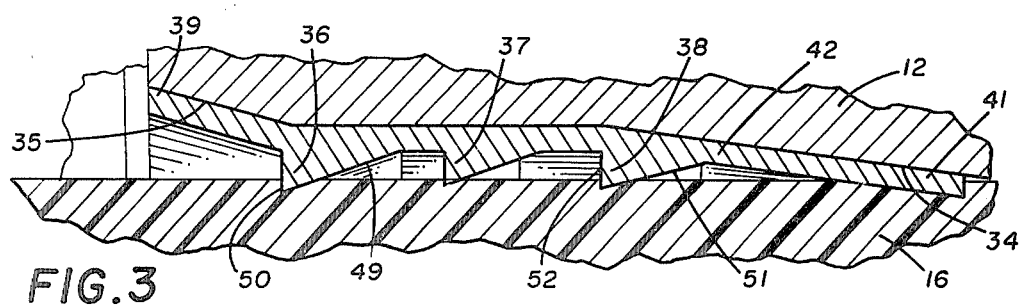
FIG. 3 is a fragmentary diametric section illustrating the arrangement of a portion of the fitting upon completion of the make-up thereof.

Axial outward movement of the tube end from the fully inserted position of FIG. 2 now causes the tooth 36 to be mechanically interlocked with the tube end, as shown in FIG. 3, as a result of the movement of the tube end against the radial planar outer surface 49 of the annular tooth 36. Thus, the axial outward movment of the tube end causes the sleeve thusly interlocked with the tube end to be urged axially outwardly therewith so as to bring the frustoconical inner end portion 39 thereof into facial engagement with the frustoconical surface 35 of the nut 12, as seen in FIG. 3. At the same time, the axial outward movment of the sleeve with the tube end causes the frustoconical outer end portion 41 to be guided by the surface 34 radially inwardly, thereby deforming the outer end of the sleeve and causing the tooth 38 to be constricted radially inwardly into the tube end 16, as further shown in FIG. 3. More specifically as shown in FIG. 3, tooth 38 is defined by an axial frustoconical outer surface 51 and a radial planar axial inner surface 52 to provide the desired additional mechanical interlock of the sleeve to the tube end, as shown in FIG. 3.

As further shown in FIG. 3, the radial constriction of the sleeve by the engagement of surface 42 thereof with the nut guide surface 34 may further effect a constriction of the midportion of the sleeve so as to urge tooth 37 also into the tube end to provide a still further mechanical interlock between the sleeve and the tube end.

As shown in FIG. 2, the outer portion 41 of the sleeve is effectively captured between the nut guide surface 34 and the outer surface of the tube end to assist the inner portion 39 of the sleeve in its engagement with the nut surface 35 in effectively positively locking the sleeve in place within the nut member, while at the same time permitting its mechanical interlocked association with the tube end 16 to provide a positive mechanical locking of the tube end in the fitting.

Thus, the positive mechanical connection of the tube end provided by sleeve 14 cooperates with the sealing of the tube end to the nut by the sealing ring 15 in providing an improved positive sealed connection of the tube end to the fitting as a result of a simple push-to-connect insertion of the tube end thereinto. In effecting the constriction of the teeth into the outer portion of the tube wall, the eyelet effectively supports the tube end internally so as to assure a positive mechanical interlocked association between the teeth and the tube end. Similarly, as seen in FIG. 2, the eyelet may extend radially within the sealing ring 15 so as to provide a further improved positive seal of the tube end to the nut.

The frustoconical axially outer surfaces of each of the teeth assures facilitated insertion of the tube end to the fully inserted position of FIG. 2 notwithstanding some dimensional tolerances wherein a slight interference between the tips of the teeth and the outer surface of the tube end may occur. However, the positive retaining shoulder effect of the planar radially outer surfaces of each of the teeth effects a positive mechanical locking of the tube end as a result of the slight axial outward displacement of the tube end from the fully inserted position to the fully made-up arrangement of the fitting, as illustrated in FIG. 3.

Thus, the fitting requires no tools to effect the connection of the tube end to the fitting as the tube end may be simply inserted into the tube fitting as arranged in FIG. 1 with the axial outward movement of the tube end from the fully inserted position effecting the desired positive connection of the tube end to the fitting as discussed above. The O-ring is located outwardly of any portion of the tube end which is engaged by the interlocking teeth so as to assure a smooth sealing surface on the tube end engaged by the sealing ring for further improved sealed connection of the tube end to the fitting.

The axial outward movement of the tube end to effect the completion of the make-up of the fitting may be effected as desired such as axial outward pulling of the tube end from the fully inserted position, the application of suitable low air pressure, such as 30 lbs. per square inch, etc.

The fitting permits the tube end to rotate about the axis of the fitting after completion of the make-up so as to eliminate the possibility of torsional loading in the use of the connection. Thus, improved life of the connection is obtained for applications, such as the air-brake application discussed above, where turning of the tubing may readily occur in use.

The foregoing disclosure of specific embodiments is illustrative of the broad inventive concepts comprehended by the invention.

We claim:

1. In a push-to-connect fitting for sealed connection to a synthetic resin tube end, the fitting including a body having a through bore defining a stepped recess at an axially outer end thereof, and an eyelet coaxially received in said recess for coaxially receiving and internally supporting a tube end therein, the improvement comprising:

a nut removably secured to said body coaxially of said bore and having a tubular guide portion spaced coaxially about said eyelet within said recess and defining axially outwardly narrowing frustoconical camming surface means;
a radially constrictible tubular sleeve received coaxially within said guide portion and defining a plurality of coaxial, annular, axially spaced biting teeth including an axially inner tooth and at least one axially outer tooth, said inner tooth having an inner diameter less than the inner diameter of said at least one axially outer tooth, said inner tooth have a preselected configuration defining means for permitting axial inward movement of the tube end between said inner tooth and said eyelet and providing interlocking engagement of said sleeve with said tube end as an incident of axially outward movement of the tube end and sleeve between said nut and said eyelet said guide portion of the nut urging said inner tooth and at least the axially outermost of said biting teeth radially inwardly solely as an incident of constriction of said sleeve as a result of said axially outward movement of said sleeve against said guide portion of the nut to cause said at least one axially outermost tooth to be also interlocked with said tube end for effectively limiting further axially outward movement of the tube end; and
means for sealing said tube end to at least one of said body and nut members.

2. The push-to-connect fitting of claim 1 wherein said sleeve includes two axially outer teeth.

3. The push-to-connect fitting of claim 1 wherein said outer teeth have substantially equal tip radii.

4. The push-to-connect fitting of claim 1 wherein said inner tooth has a conical axially outwardly widening axially outer surface.

5. The push-to-connect fitting of claim 1 wherein said inner tooth has a conical axially outwardly widening axially outer surface and a radially planar axially inner surface terminating radially inwardly in a sharp annular biting edge.

6. The push-to-connect fitting of claim 1 wherein each tooth has a conical axially outwardly widening axially outer surface and a radially planar axially inner surface terminating radially inwardly in a sharp annular biting edge.

7. In a push-to-connect fitting for sealed connection to a synthetic resin tube end, the fitting including a body having a through bore defining a stepped recess at an axially outer end thereof, and an eyelet coaxially received in said recess for coaxially receiving and internally supporting a tube end therein, the improvement comprising:

a nut removably secured to said body coaxially of said bore and having a tubular guide portion spaced coaxially about said eyelet within said recess and defining an axially outer axially outwardly narrowing frustoconical camming surface, a cylindrical midportion, and an axially inner axially outwardly narrowing frustoconical stop surface;
a radially constrictible split tubular sleeve received coaxially within said guide portion and defining a plurality of coaxial, annular, axially spaced radially inwardly projecting biting teeth including an axially inner tooth and at least one axially outer tooth, said inner tooth being disposed radially inwardly of said stop surface and having an inner diameter smaller than the outer diameter of the tube end, said inner tooth having an axially outwardly widening axially outer surface defining means for permitting substantially free axial inward movement of the tube end between said inner tooth and said eyelet and having a planar axially inner axially inwardly facing shoulder defining means providing interlocking engagement of said sleeve with said tube end solely as an incident of constriction of said sleeve as a result of said axially outward movement of the tube end and sleeve between said nut and said eyelet, said sleeve further defining an axially inner axially outwardly narrowing deflectible inner end portion disposed radially and axially inwardly of said nut stop surface and urged thereagainst as a result of said sleeve being urged axially outwardly by said outward movement of the tube end, said sleeve further having an axially outer, axially outwardly narrowing deflectible outer end portion disposed radially and axially inwardly of said nut camming surface and urged thereagainst as a result of said sleeve being urged axially outwardly by said outward movement of the tube end, said camming surface deflecting said outer end portion radially inwardly and thereby urging at least the axially outermost of said biting teeth radially inwardly solely as an incident of radial constriction thereof to cause said at least one axially outermost tooth to be constricted into said tube end for cooperating with said inner tooth in effectively limiting further axially outward movement of the tube end; and means for sealing said tube end to at least one of said body and nut members.

8. The push-to-connect fitting of claim 7 wherein said deflatable inner end portion extends axially inwardly from said inner tooth.

9. The push-to-connect fitting of claim 7 wherein said deflectable outer end portion extends axially outwardly from the axially outermost outer tooth.

10. The push-to-connect fitting of claim 7 wherein said deflectible inner end portion comprises a frustoconical portion extending axially inwardly from said inner tooth.

11. The push-to-connect fitting of claim 7 wherein said deflectible outer end portion comprises a frustoconical portion extending axially outwardly from the axially outermost outer tooth.

12. The push-to-connect fitting of claim 7 wherein said sleeve end portions comprise coaxial frustoconical deflectible end, portions.

13. The push-to-connect fitting of claim 7 wherein said deflectible outer end portion is frustoconical and at least one tooth is carried coaxially by said outer end portion.

14. The push-to-connect fitting of claim 7 wherein said sleeve includes a cylindrical portion coaxially between said inner and outer teeth.

15. The push-to-connect fitting of claim 7 wherein a pair of outer teeth are provided and said sleeve includes a cylindrical portion coaxially therebetween.

* * * * *